Feb. 27, 1945. H. O. IRMSCHER 2,370,168
MACHINE FOR MANUFACTURING HEAT SEALING FILTER SHEET MATERIALS
Filed Feb. 24, 1941 9 Sheets-Sheet 6

INVENTOR.
HANS O. IRMSCHER
BY Louis Barnett
ATTORNEY

Feb. 27, 1945.     H. O. IRMSCHER     2,370,168
MACHINE FOR MANUFACTURING HEAT SEALING FILTER SHEET MATERIALS
Filed Feb. 24, 1941     9 Sheets-Sheet 8

INVENTOR.
HANS O. IRMSCHER
BY
Louis Barnett
ATTORNEY

Patented Feb. 27, 1945

2,370,168

UNITED STATES PATENT OFFICE 2,370,168

MACHINE FOR MANUFACTURING HEAT SEALING FILTER SHEET MATERIALS

Hans O. Irmscher, Roslyn, N. Y., assignor to National Urn Bag Co., Inc., Long Island City, N. Y., a corporation of New York Application February 24, 1941, Serial No. 380,230
In Canada February 11, 1941

8 Claims. (Cl. 91—18)

The invention relates to the manufacture of a heat sealing filter sheet material, and more particularly is directed to machines for applying on a pervious textile or paper base layer web an adhering superficial coating comprising a porous film or lamina which has heat sealing properties without appreciably decreasing the original porosity or practically effecting the filtering capacity of said web. Said heat sealing filter sheet materials may be like those described in application Ser. No. 370,688, filed December 18, 1940, by Theodore F. Menzel for use in making infusion packages or the like.

Among the objects of the invention is to generally improve machines of the character described which shall comprise few and simple parts that are readily assembled to form a rugged easily operated apparatus of high output capacity which shall be inexpensive to construct, and which shall be practical and efficient to a high degree in use.

Other objects of this invention will in part be obvious and in part hereinafter pointed out.

The invention accordingly consists in the features of construction, combinations of elements and arrangement of parts which will be exemplified in the constructions hereinafter described and of which the scope of application will be indicated in the following claims.

In the accompanying drawings, in which are shown various possible illustrative embodiments of this invention.

Referring in detail to the drawings 20 denotes generally a machine constructed to embody the invention which, as seen from Figs. 1, 3, 5 and 9, has a suitable elongated horizontally extending bed plate 21 formed with downwardly projecting edge flanges 21a, said bed plate 21 being raised on spaced vertical supports or legs 22 to a desired level over a floor F. The feeding end 21b of the bed plate 21, as shown in Figs. 1, 2, 3 and 11, rigidly supports an outwardly extending bracket 23 which terminates at 23a in a firm anchorage for one end 24a of a stud shaft 24 on which a suitable proportioned reel or spool 25 is rotatably mounted, as shown in Fig. 4. A screw set collar 26 on the free end 24b of said shaft 24 removably retains the reel 25 against accidental displacement from said shaft 24.

Figures 13, 14:
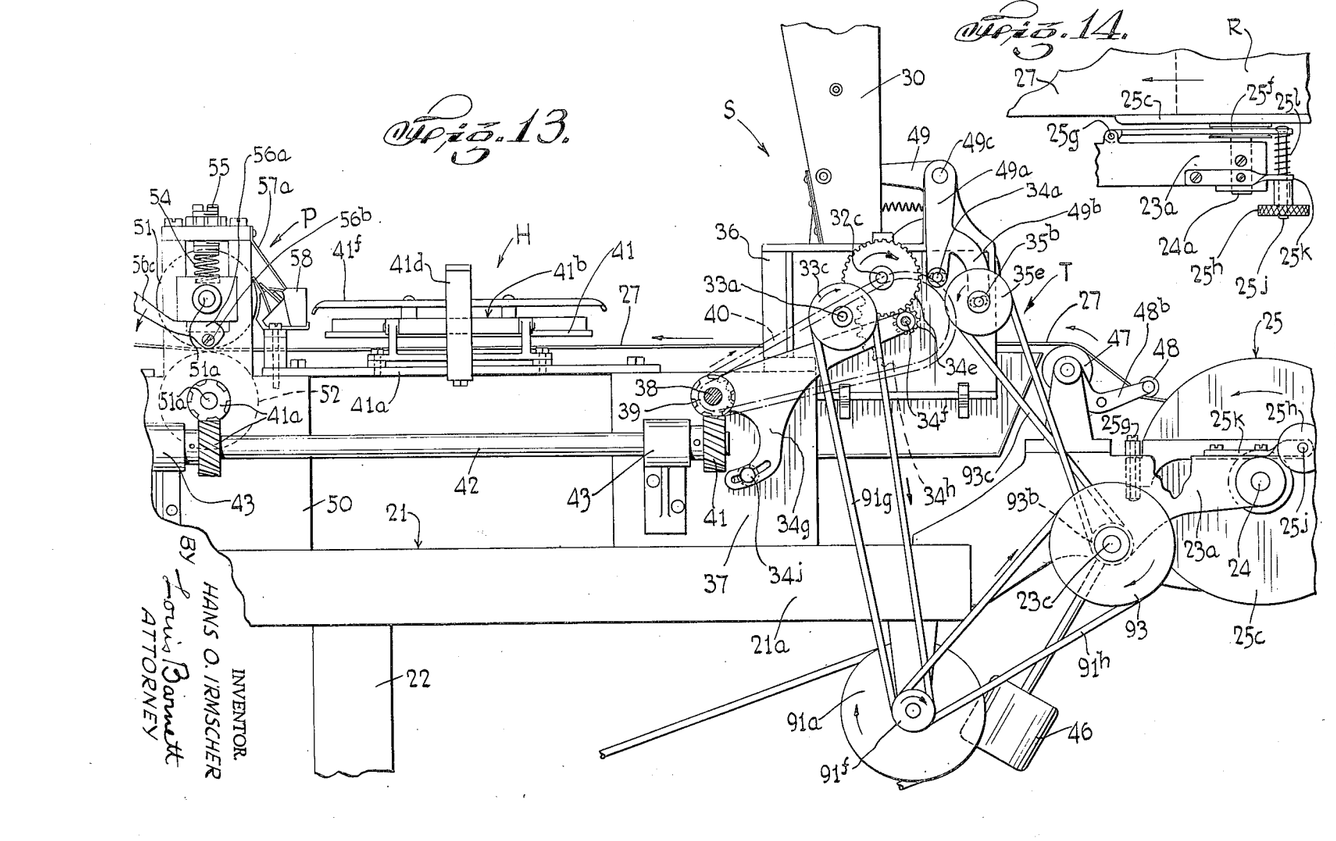

The reel 25 has wound about a core 25a and between spaced disc sides 25b and 25c thereof a supply roll R of a relatively thin pervious base layer web 27 which is to be superficially coated by machine 20 to form the heat sealing filter sheet material 28 in the manner hereinafter described. The disc side 25b may be made removable from the core 25a by using a split collar 29 releasably screw threaded and bolted in position, the disc side 25c being made integral with said core 25a and with an aligning boss 25d, as shown in detail in Fig. 4. The boss 25d has a peripheral groove 25e into which a releasably adjustable spring latch 25f engages. The latter is hinged at 25g for movement on the bracket terminal 23a, as shown in Figs. 13 and 14, and serves to adjust the reel 25 with the roll R along the shaft 24 so that the travel of the web 27 may be shifted for alignment with respect to any requirement of the subsequent passage of said web 27 through the machine 20. Said aligning adjustment is accomplished by means of a hand wheel 25h screwed on a threaded bolt 25j connecting with the latch 25f, said bolt 25j passing through a supporting strap 25k secured on the bracket terminal 23a. A compression spring 25—l on the bolt 25j is interposed between the strap 25k and the hand wheel 25h so that on screwing the hand wheel 25h on the threaded bolt 25j, the reel 25 may be readily shifted along the stud shaft 24 as required for adjustably aligning the travel of the web 27 in the operation of the machine 20.

Figure 1:
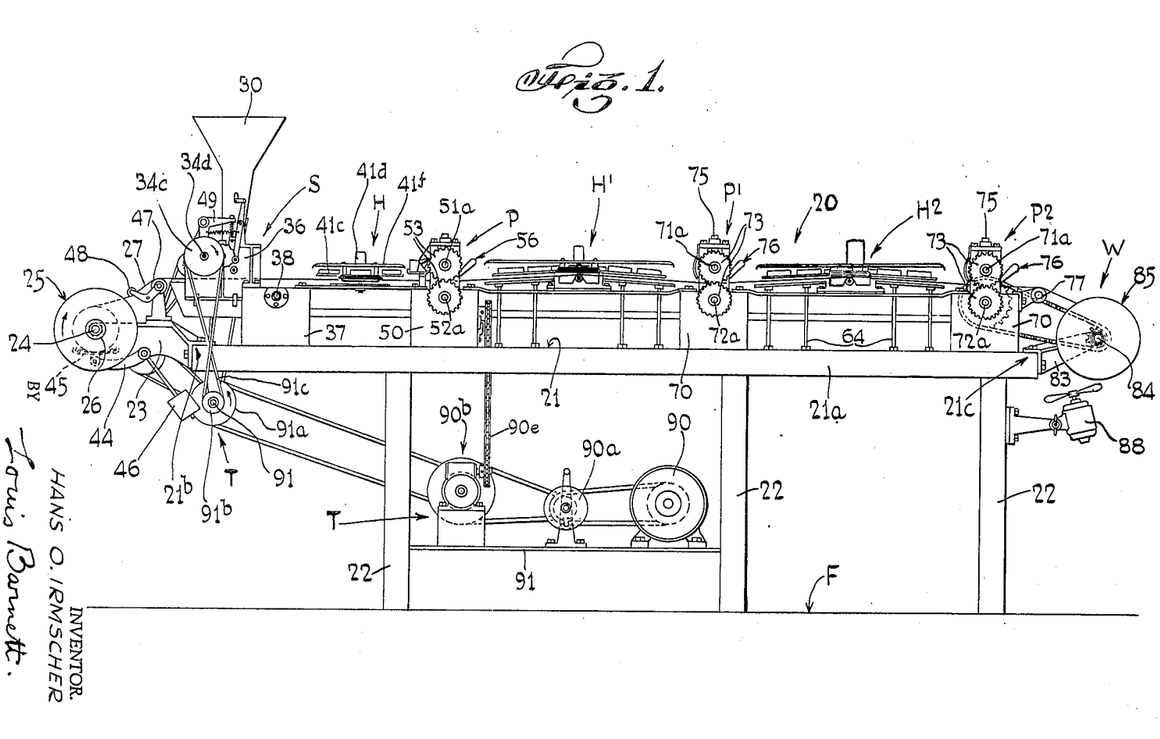
Figs. 1 and 2 are side elevational and top plan views, respectively, of a machine for manufacturing a heat sealing filter sheet material constructed to embody the invention.
Figures 3, 4:
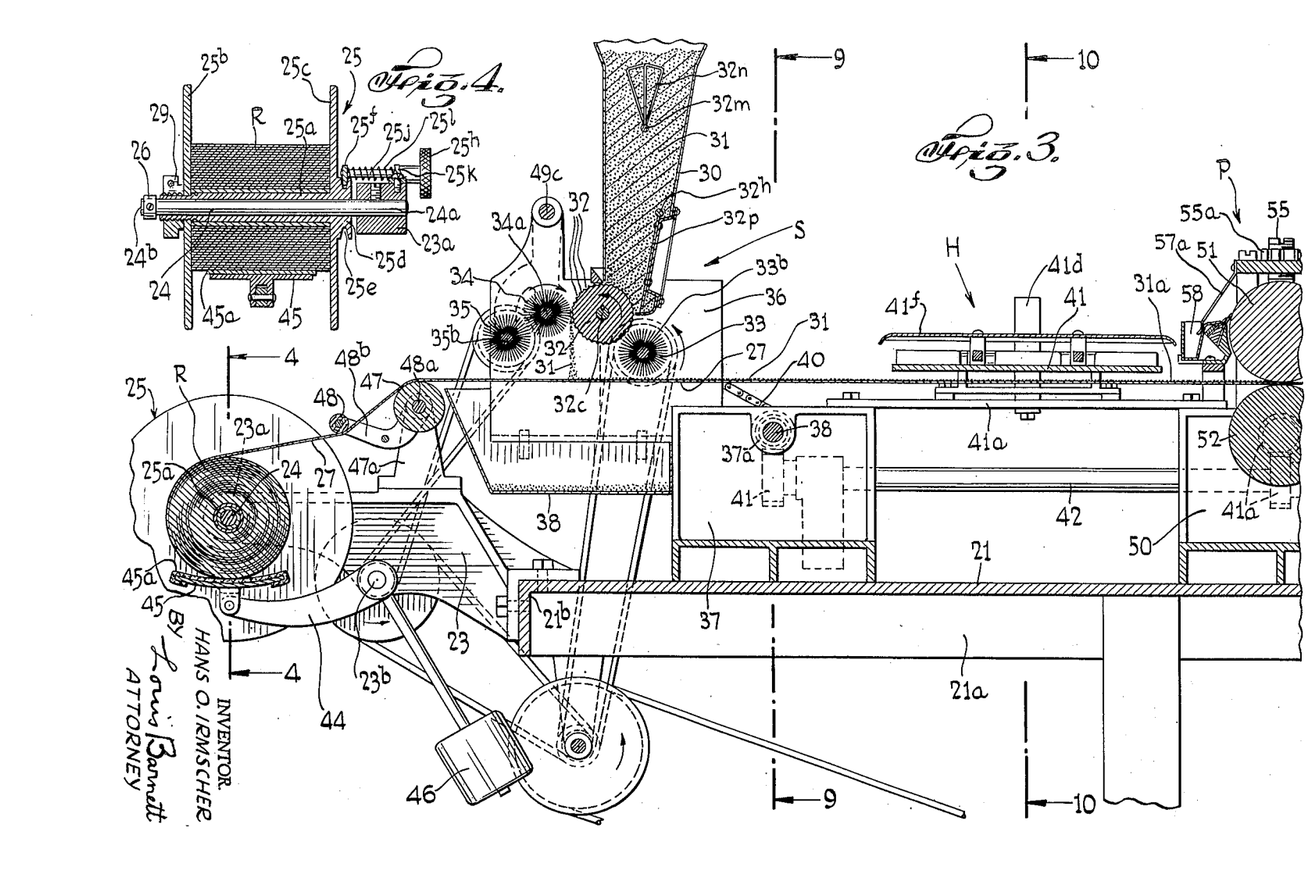
Fig. 3 is a cross-sectional view of the feeding end of the improved machine taken on line 3—3 in Fig. 2.
Fig. 4 is a detailed cross-sectional view taken on line 4—4 in Fig. 3.
Figures 11, 12:
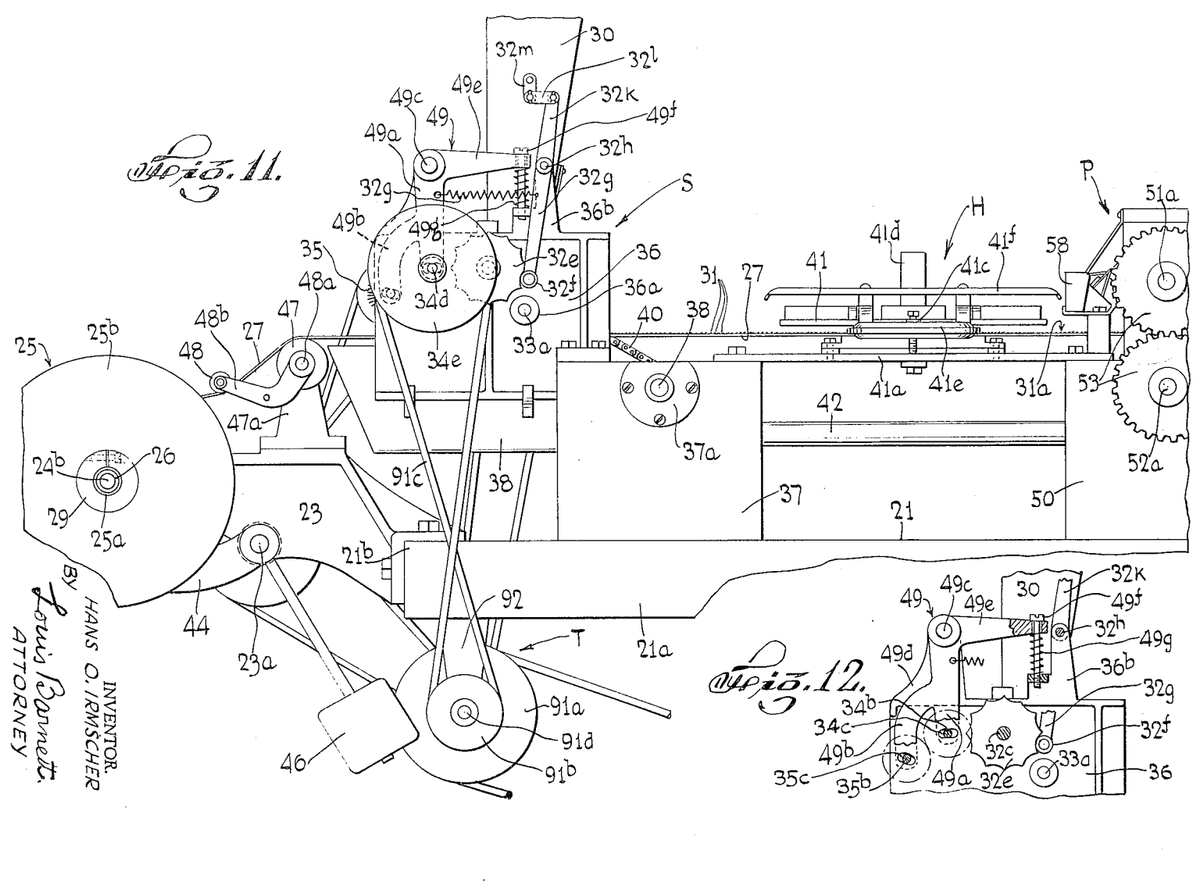
Figs. 11 and 13 are front and rear side elevational views, respectively, of the feeding end of the improved machine.
Figs. 12 and 14 are fragmentary views of detailed adjusting parts shown in Figs. 11 and 13, respectively.

As shown in Figs. 1, 3 and 11, supported to extend frontward from the bracket 23 on a stub shaft 23b is a lever arm 44 carrying a brake shoe 45 having a suitable non-abrasive lining 45a, said arm 44 and shoe 45 being adjustably balanced by a slidable counterweight 46. The brake shoe 45 is so arranged as to smoothly press the lining 45a thereof against the supply roll R to serve as a drag for preventing accidental unwinding, the counterweight 46 being adjusted for varying the pressure to permit a smooth and even feed of the travelling web 27 to the requirement of the operations of machine 20.

In order that the travelling webs 27 be brought to the proper height required when passing horizontally through the machine 20, a levelling roller 47 mounted on upright fitting 47a is provided, the latter being supported from the upper side of bracket 23. Before said web 27 reaches the roller 47 it passes under a slack take-up roller 48 which is hinged at 48a by arms 48b from the upright fitting 47a. The take-up roller 48 compensates for any irregularities of the unwinding of the web 27 from the roll R on the reel 25.

The base layer web 27 may be a continuous paper strip made from a vegetable fibrous pulp stock, and when processed by machine 20 in the manner hereinafter described forms the heat sealing filter paper sheet 28. The pervious paper layer web 27 preferably is of a quality having a relatively high wet strength capable of withstanding immersion in boiling water without damage or disintegration, yet permitting ready passage therethrough of the water of immersion for forming a brew and straining the contents of a bag when used for making bags for tea-balls, or the like infusion package (not shown).

Extending over the bed plate end 21b is a coating spreader, denoted generally at S, which is seen from Fig. 3 to include an upright supply receptacle 30 holding a dry powdery coating material 31 in bulk which is fed therefrom by a rotary fluted-faced roller 32 for uniformly spreading said coating material 31 on the underlying travelling web 27 in quantities measured by the contents of the roller flutes 32a and in proportion to the rate of rotation of the roller 32.

The coating material 31 may be a finely divided plastic of a natural or synthetic thermoplastic resin, such for example of the phenol, urea, formaldehyde, glycerol, phthalic anhydride, acetylene, rubber or petroleum group. The thermoplastic resin used in the coating process here described in the operation of machine 20 is a thermosetting polymerizing resinous product, such as a finely powdered copolymer of vinyl chloride and vinyl acetate. This latter will make the heat sealing filter sheet material 28 with a thermosetting superficial coating on the base layer web 27 after being processed by machine 20 with no part of said sheet material 28 that will dissolve, give off any odor, alter the taste, or otherwise impart toxic or injurious effects when used in connection with a food product such as in making brews with tea and coffee balls.

In order to assure an even feed and uniform spread of the coating material 31 onto the traveling web 27, a rotary brush 34 operates to sweep said material 31 from the roller flutes 32a over the web 27, a secondary rotary brush 33 spaced from brush 34 removes any material 31 from flutes 32a that the brush 34 fails to sweep out, and an auxiliary rotary brush 35 cooperates to keep the brush 34 clean. The location of the fluted roller 32, brushes 33, 34 and 35 is shown in Fig. 3, the arrows indicating their relative operating rotation for the purposes above described.

Figure 9:
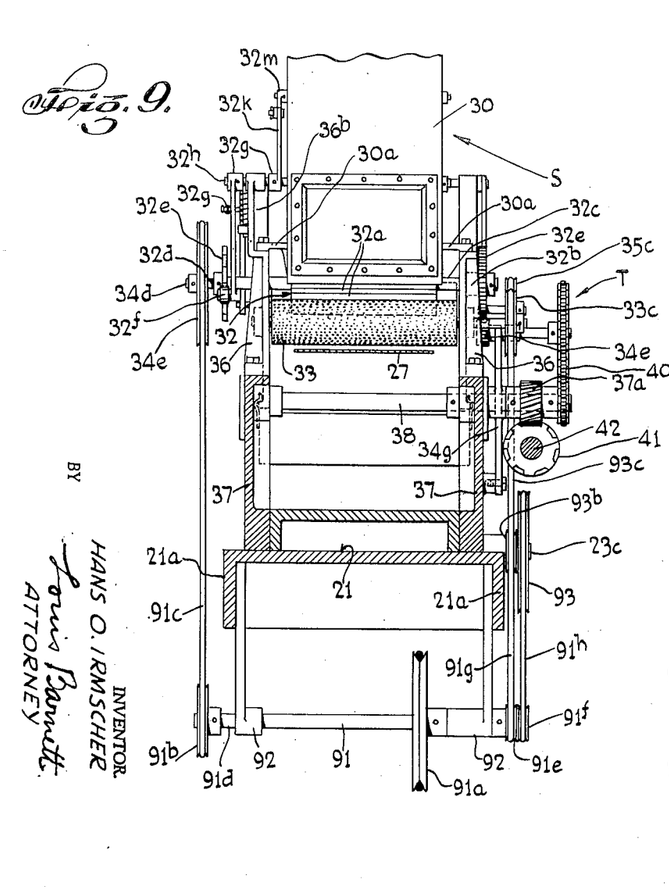
Figs. 9 and 10 are cross-sectional views taken on lines 9—9 and 10—10, respectively, in Fig. 3.
Figure 10:
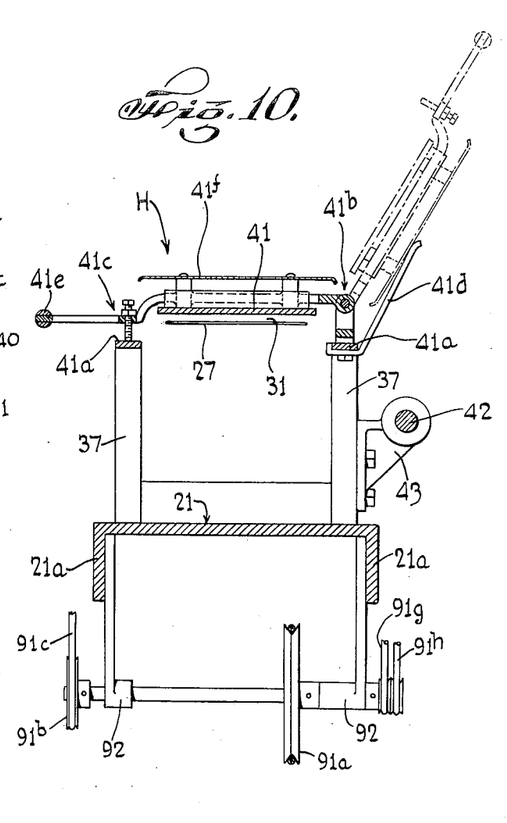

As shown in Fig. 9, the receptacle 30 is supported by bolted front and rear extending pieces 30a to upstand on spaced side plates 36 between which the fluted roller 32 and brushes 33, 34 and 35 are journalled and between which the web 27 travels horizontally. The side plates 36 in turn may be bolted upright to overhang spaced upright supporting pieces 37 which are rigidly mounted on the bed plate 21 as shown in Figs. 3, 9, 11 and 13. A suitable collection pan 38 is removably suspended from lower edges of the side plates 36 for catching any surplus spillage of the coating material 31 dropping from the travelling web 27. The side plates 36 may be formed with spaced aligned bearing block portions 32b for the shaft 32c which carry the fluted roller 32 and suitable spaced aligned bearing block portions which carry shafts 33a, 34a and 35a of the brushes 33, 34 and 35, respectively. The upright supporting pieces 37 may also be formed with spaced aligned bearings 37a for a cross shaft 38 having a rearwardly overhanging sprocket 39 for driving a chain 40 of a suitable power transmission T hereinafter described in more detail.

As shown in Figs. 11 and 12, the front and rear ends 34b and 35b of the brush shafts 34a and 35a, respectively, may be mounted in suitable floating supports, as for example, by having said shaft ends 34b and 35b extending through elongated openings 34c and 35c, respectively, said shaft ends 34b and 35b being journalled in spaced duplex arms 49a and 49b of a bell crank fitting 49 which is pivoted at shaft 49c on upwardly extending supports 49d. Another arm 49e of the bell crank 49 is resiliently supported on a compression spring 49g encircling a bolt 49f so that by adjusting the length of the bolt 49f the bell crank fitting 49 is swung on the pivot 49c to move the shaft ends 34b and 35b with the brushes 34 and 35, whereby their effective sweeping action on the fluted roller 32 may be controlled.

As shown in Figs. 9, 11 and 13, on the front end 32d of the fluted roller shaft 32c there is mounted a cam oscillating wheel 32e which cooperates with a roller end 32f of a double ended lever 32g pivoted on a shaft 32h, the latter being secured on an upward extension 36b of the front side plate 36. The upper end 32k of the lever 32g is connected with a link 32—l through the shaft 32h and a crank shaft 32m, both shafts 32h and 32m extending through the walls of the receptacle 30 to operate upwardly extending breaker plate 32n and downwardly extending feed plate 32p, respectively, said plates being mounted for movement with shafts 32h and 32m to prevent the caking of the bulk coating material 31 in receptacle 30 and to insure the uniform feeding thereof to the fluted shaft 32. A tension spring 32q interconnecting the crank arm 49a with lever 32g keeps the lever roller end 32f in operative position against cam oscillating wheel 32.

The travelling base layer 27 in passing through spreader S has the upper surface thereof covered with the powdered coating material 31 after which it passes through a heater and clamping unit of suitable construction. Said unit may comprise an electrical resistance heater, denoted generally at H, spaced from spreader S along bed plate 21 for heating the powdered coating material 31 to a degree sufficient only to cause said coating material 31 to become plastic or molten, and flow, that is, to soften, coalesce and cohere as at 31a in Fig. 3, and a suitable pressure means denoted generally at P, spaced from the heater H along bed plate 21 as shown in Figs. 1, 2, 3, 11 and 13. The travelling web 27 with the coating material 31a in heated plastic state after passing through heater H is then immediately passed through the pressure means P. The coating material 31a on the web 27 after leaving the pressure means P is then a pervious film, lamina or superficial coating adhering to the base layer upper surface.

The degree of heat applied to said coating material 31 by heater H should be insufficient to cause a permanent thermosetting thereof but should form on pressing and cooling the superficial coating. When a copolymer of vinyl chloride and vinyl acetate is used as coating material 31, the heating temperature of approximately 65° C. will be found satisfactory in forming said superficial coating. With the base layer 27 made of a vegetable fibre pulp, the pressed superficial coating on cooling and adhering to base layer surface, is found to be retained by an adsorption thereof around and about the pulp fibres as a pervious structure without substantially decreasing the original porosity, or practically effecting the filtering capacity of the paper base layer 27.

Figures 5, 6, 7, 8:
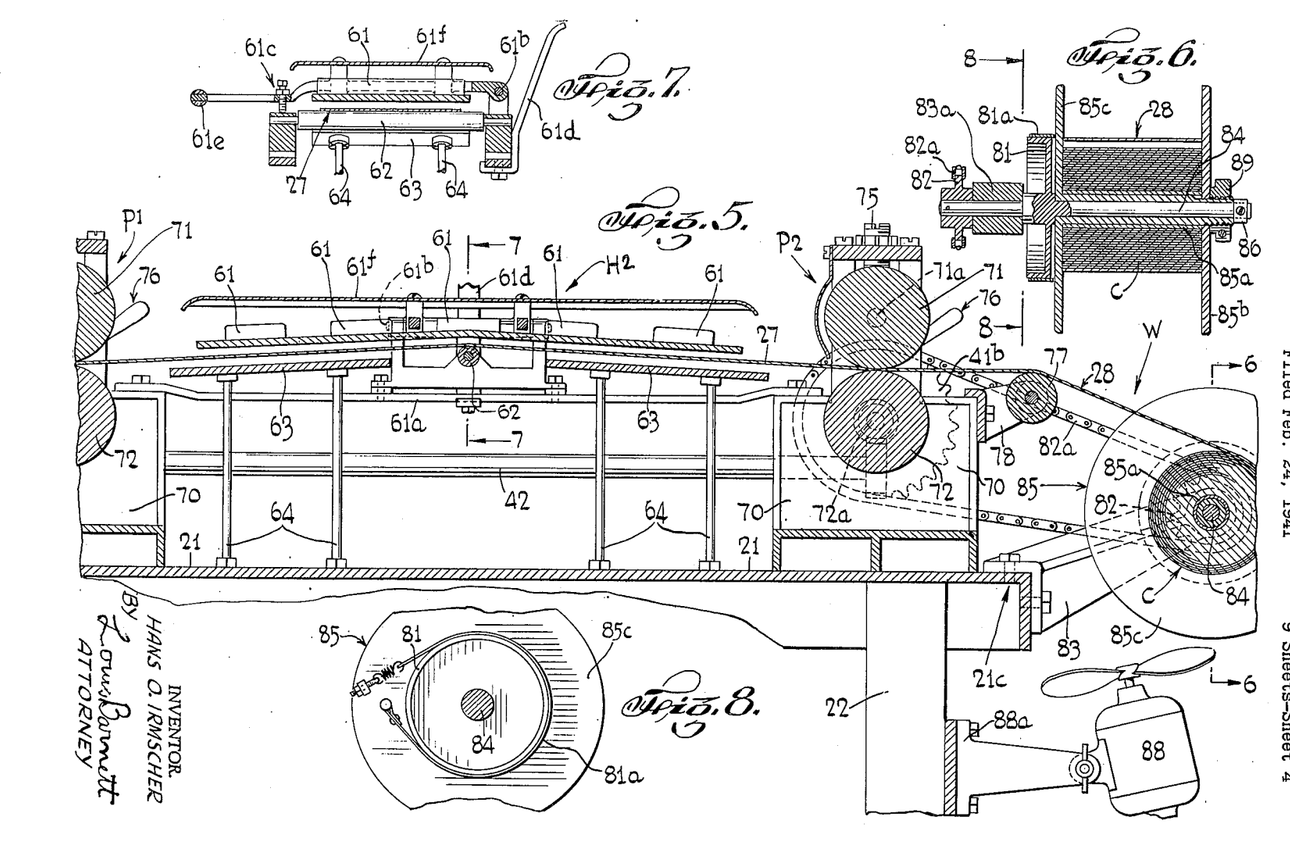
Fig. 5 is a cross-sectional view of the discharge end of the improved machine taken on line 5—5 in Fig. 2.
Figs. 6 and 7 are detailed cross-sectional views taken on line 6—6 and 7—7, respectively, in Fig. 5.
Fig. 8 is a sectional view as seen from line 8—8 in Fig. 6.

Should it be desired to have a machine embodying the invention of small output capacity, the web 27 with the adhering superficial coating may be slowly passed therethrough and as they leave the pressure means P can be cooled to about room temperature and coiled up on suitable rewinding means W in the manner hereinafter described and as shown in Figs. 1, 5 and 6. When so cooled the pressed superficial coating hardens and will hereinafter be referred to as being in a "partially fused" state or as being applied to the web 27 by "partial fusion." In this state the pressed superficial coating is dry and forms with base layer 27 the heat sealing filter sheet material 28 which remains flexible and may be coiled up in rolls C by rewinding means W ready for use in the manufacture of bags of infusion packages or the like.

The heat sealing filter sheet material 28 when used for making containers or bags for tea-balls or the like has the superficial coating side thereof on the interior surface of such bags. The edge joints or seams, and top and bottom closure seams, being made by having said coating portions thereof in face to face relation, are pressed together and thermoset at a final fusion temperature by suitable clamping means (not shown) of any well understood construction to unite the parts from such edge joints and closure seams sealed in permanently fused adhesion as described in said Menzel application. The above described thermosetting property of filter sheet material 28 at a final fusion temperature may hereinafter be referred to as being "thermosetic."

With the "partially fused" superficial coatings formed of copolymer of vinyl chloride and vinyl acetate, such thermosetting permanent sealing fusion of the seams will take place when heated to about 130° C. and pressed by said suitable clamping means.

It has been found in practice that a 6½ pound fibrous pulp stock sheet of approximately .001 inch thick forms a practical filter paper layer web 27 for the purposes described herein. On said layer web 27 the finely powdered copolymer of vinyl chloride and vinyl acetate uniformly sprinkled or sprayed, heated and pressed to "partial fusion" thereon, provides a satisfactory pervious, dry, extremely thin coating of approximately 3 ounces in weight for each pound of the layer web 27 and normally less than .0005 inch thick.

Figure 2:
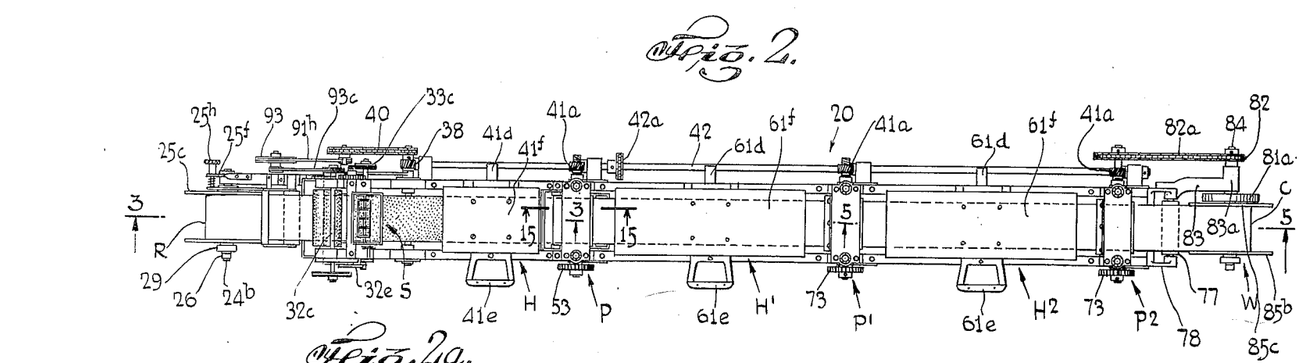

In the embodiment of the invention herein described and as illustrated in the drawings, the machine 20 is constructed for quantity production. Consequently, the operation is carried out at a relatively higher travel speed of the base layer 27 than in providing the heater and clamping unit comprising but a single heater H and pressure means P, as so far described. Machine 20, therefore, depending on the capacity required, is constructed to include one or more additional heater and clamping units, similar to heater H and pressure means P, as for example, electrical resistance heaters H1 and H2 coacting with pressure means P1 and P2, respectively. Said units comprise heaters H and pressure means P, heater H1 and pressure means P1 and heater H2 and pressure means P2 arranged in spaced tandem, that is, series relation along the bed plate 21, through which the travelling web 27 with the coating material successively passes until it is coiled up in the roll C by the rewinder W, as is shown in Figs. 1, 2 and 5. The final product turned out by machine 20 in every case will be heat sealing filter sheet 28 having the construction and properties above described.

A more detailed description of the portions of machine 20 which have been denoted generally as H, H1, H2, P, P1, P2, W and T, will now be given.

The heater H as seen from Figs. 1, 3, 10, 11 and 13 may comprise an electrical resistance type of heater plate 41 of any well known construction arranged when in effective position to extend parallel to and preferably in close proximity over the path of travel of the web 27. Said plate 41 is supported on a bolted bar 41a extending between the upright hanger 37 and pillow blocks 50 of the pressure means P. Said heater plate 41 is mounted for swinging movement, shown in full and dotted line positions in Fig. 10, on a hinged fitting 41b so that free access to the underlying travelling web 27 with coating material 31 may be had when desired. Said heater plate 41 construction may also include a releasable, quick-adjusting fastening means 41c on the side thereof opposite to the hinged portion 41b, a back stop 41d for limiting the swing movement thereof, and a suitable lift handle 41e adjacent said fastening means 41c. There may also be provided a guard or shield 41f secured at a spaced distance from and extending to overlie the upper exposed surface of the heater plate 41 to protect the same from being damaged or causing damage or injury.

Figures 15, 16:
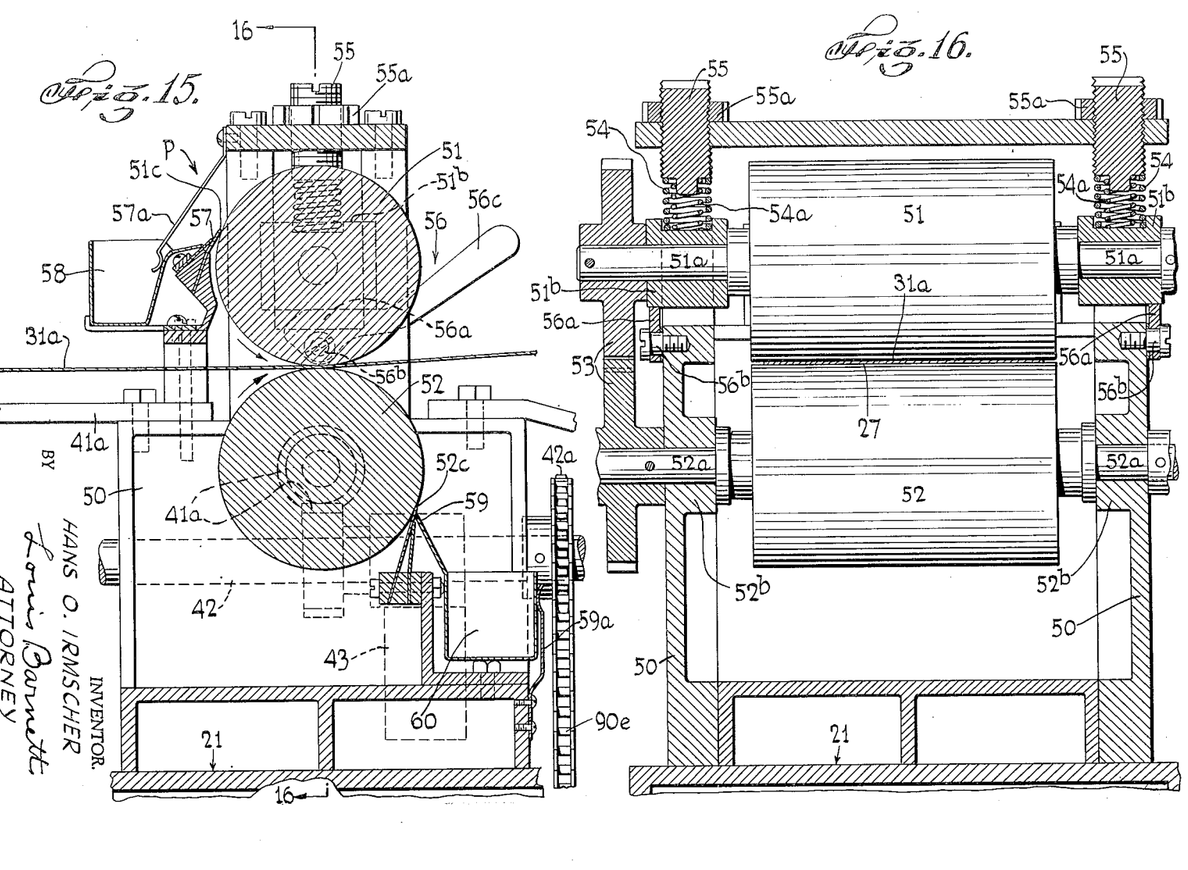
Fig. 15 is a cross-sectional view taken on line 15—15 in Fig. 2.
Fig. 16 is a cross-sectional view taken on line 16—16 in Fig. 15.

The pressure means P which cooperates with heater H, as seen from Figs. 1, 2, 3, 11, 15 and 16, may comprise a pair of rollers 51 and 52, respectively, mounted on vertically aligned upper and lower shafts 51a and 52a, respectively, the latter being journalled between the spaced pillow blocks 50 mounted on the bed plate 21. Between said rollers 51 and 52 the web 27 carrying the molten coating material 31a is compressed. The shafts 51a and 52a are geared, as at 53, for rotation as shown by the arrows in Fig. 15, to correspond with the direction of travel of the web 27. Bearings 51b, in which the ends of the upper shaft 51a turn, may be movable or float mounted, preferably being resiliently supported by concentrically arranged compression springs 54 and 54a. The degree of resiliency may be adjusted by jack screws 55, one for each bearing 51b as shown in Figs. 15 and 16. Locknuts 55a on jack screws 55 serve to retain any set adjustment of said resilient effect. Bearings 52b, in which the lower shaft 52 turns, may be formed as part of the pillow blocks 50.

To facilitate threading or removing the web 27 from between the rollers 51 and 52 a pair of spaced levers 56 having cam lift portions 56a is provided, one under each bearing 51d, said levers 56 being pivoted as to 56b. Suitable handle ends 56c on each of said levers 56 are provided to raise the bearings 51b with the ends of the shaft 51a and roller 51 against the action of the springs 54 and 54a.

Since the molten coating material when it is compressed between the rollers 51 and 52 is still in a plastic state, the surface of the upper roller 51 has been found to become smeared with said coating material when contacting therewith. To overcome this difficulty a suitable scraper or doctor 57 mounted adjacent the roller 51 is provided to press against said surface as at 51c, the scrapings being collected in a suitably demountable upper receptacle 58, as shown in Fig. 15. Since the lower roller 52 is somewhat longer than the width of the web 27, said roller 52 may also become smeared in use. To maintain the surface of said roller 52 clean, another scraper or doctor 59 is provided to press against said latter surface as at 52c, the scrapings being collected in a suitably demountable lower receptacle 60, as shown in Fig. 15.

Spring clips 57a and 59a may be provided for releasably retaining the receptacles 59 and 60, respectively, in their mounted positions.

The heaters H1 and H2, as seen from Figs. 1, 5 and 7, may each comprise electrical resistance type of heat plate 61 of similar construction as heat plate 41 except that heat plate 61 may be longer to give it greater effective heat radiating area and to span the distance between the successive pressure means P and P1 and from P1 to P2 which preferably is made longer than the distance from the spreader S to the first pressure means P. Said heater plates 61 are mounted on bolted bars 61a and hinged by fitting 61b in the manner similar to heater plate 41 so that free access to the underlying travelling web with the coating material leaving pressure means P may be had when desired.

Said heater plates 61 also each include quick adjusting releasable fastening means 61c, back stop 61d, handle 61e and guards or shields 61f like the similar parts of heater H above described. Because of the large span of heaters H1 and H2 there may be in addition provided for each a centrally located roller 62 over which the web and coating material being processed passes and side ramps 63 extending in opposite directions from said roller 62. Said ramps 63 serve as heat reflectors and also support any slack web during the threading thereof through the machine, said ramps 63 being spaced in close proximity to the underside of the web. Preferably the roller 62 and ramps 63 form a structure that raises the level of the web higher than the normal horizontal alignment of the passage of the web between the rollers of the pressure means P, P1 and P2, the ramps 63 each sloping down from the supporting roller 62 to each of the pressure means P1 and P2. This construction aids in keeping the web taut during starting, stopping and running thereof. Each of the ramps 63 may be rigidly supported in position by suitable stanchion 64 secured on the bed plate 21.

The pressure means P1 and P2 as seen from Figs. 1 and 5, may each be constructed like pressure means P described above and as shown in detailed section in Figs. 15 and 16. Pressure means P1 and P2, however, under normal conditions do not require doctors or scrapers or receptacles for scrapings as does pressure means P, otherwise the construction and operation are similar, there being provided for each pillow block 70 supported on bed plate 21 upper and lower rollers 71 and 72, respectively, mounted on shafts 71a and 72a, respectively, which are geared as at 73, said shaft ends being journalled in floating bearings, resiliently controlled by spring pressed releasably locked jack screw 75. The only difference between pressure means P, P1 and P2 is that the sets of rollers 51 and 52 of pressure means P and 71 and 72 of pressure means P1 and P2 are successively of slightly greater diameter, that is, rollers 51 and 52 are smallest, and rollers 71 and 72 of pressure means P2 are a little larger than rollers 71 and 72 of pressure means P1. This difference of diameter assures that the heated web in passing through the machine 20 is kept taut and in a slight tension condition found favorable for the production of heat sealing filter sheet material 28.

To aid in the reminding of the coated web 28 after leaving the pressure means P2, a guiding roller 77 is mounted on bracket arm 78, the latter being supported from the pillow block 70, retaining said coated web 28 in the most desired take-off location for the entire range of the coiling operation of roll C on a reel 85.

Referring now to Figs. 1, 2 and 5, the travelling web with the adhering superficial coatings forming the filter sheet material 28 as it passes through pressure means P2 and beyond is now in a finished state ready to be coiled up in roll C by suitable rewinding means W. The roll C preferably is coiled up on take-up reel or spool 85 shown in Figs. 5, 6 and 8. Like web supply reel 25, reel 85 may have a core 85a, a disc side 85c integrally formed with said core 85a, removable disc side 85b, bolted split collar 89 on end of core 85a for retaining the removable disc side 85b secured thereto, set screw collar 86 on end of a shaft 84 for retaining the reel 85 from displacement therefrom, an end 84a of the stud shaft 84 being journalled for rotation on a terminal bearing 83a of an outwardly extending bracket 83 which is bolted on the end 21c of the bed plate 21 opposite the end 21b.

The shaft 84 may project through the bearing 83a and carry thereon a pinned drive sprocket 82 which engages with a drive chain 82a. Said shaft 84 between the bearing 83a and reel 85 may also carry to turn therewith a brake drum 81 which cooperates with a suitable spring adjustable band 81a extending thereabout and secured to the disc side 85c of reel 85 as shown in Figs. 6 and 8. The brake drum 81 and band 81a serve to provide an effective tension and slippage control so that the rewound sheet material 28 of the roll C on the take-up reel 85 will be uniformly stretched without tearing.

As the rewinding of the hot sheet material 28 passing to the rewinder W proceeds, it may be brought down to room temperature, if necessary, while it is being coiled up by providing suitable cooling means, as for example, an electric fan 88 adjustable to direct a flow of air against the roll C. The fan 88 may be bolted at 88a on one of the bed plate legs 22, and supplied with power from a suitable source (not shown) in the well understood manner.

Figures 2A, 2B:
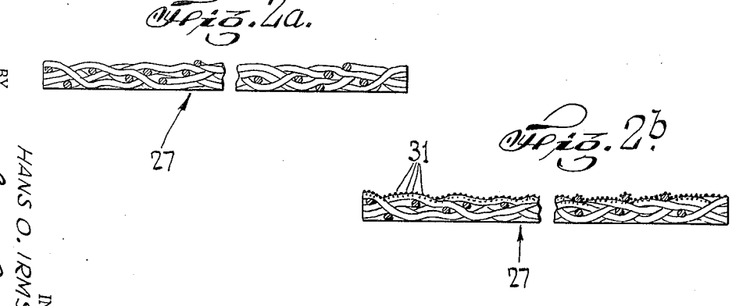
Figs. 2a, 2b and 2c are detailed enlarged sectional views showing successive sectional views taken during the passage of a vegetable fibrous pulp porous base layer web through the machine to provide said heat sealing filter sheet material.
Figure 2C:
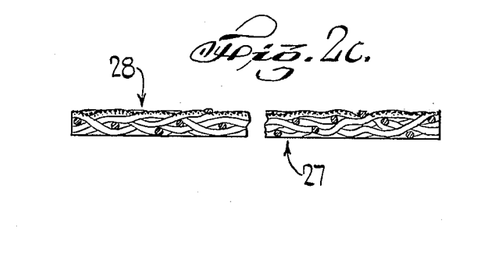

In Figs. 2a, 2b and 2c are shown progressive sectional views of the coating operations of machine 20 first, as of the porous base web 27 supplied from roll R, next the base web 27 with the coating material 31 sprayed thereon as it leaves the spreader S and before being heated and pressed by heater H and pressure means P, and finally, the finished heat sealing filter sheet material 28 which is re-rolled in coil C.

The power transmission T as shown in Fig. 1, may be supplied through an electric motor 90 with a speed changer 90a and speed reducing means 90b, if desired, all installed on a platform 91 supported on legs 22 under the bed plate 21. From the speed reducing means 90b the rotary brush 34 is driven through a first counter shaft 91 having mounted to turn therewith a belt driven pulley 91a and a drive pulley 91b, the latter by a cross belt 91c which drives a pulley 34e mounted to turn with the front extension of shaft 34d on which the rotary brush 34 is secured, as shown in Figs. 1 and 11. The shaft 91 is suspended from the bed plate 21 on spaced hanger bearings 92, the drive pulley 91b being mounted on a front overhanging extension 91d of counter shaft 91 as shown in Fig. 9. The counter shaft 91 also extends through the bearings 92 rearwardly to carry abutted overhanging pulleys 91e and 91f. As shown in Figs. 9 and 13, the pulley 91e through a belt 91g drives a pulley 33c secured to turn with the sweep brush shaft 33a and the pulley 91f through belt 91h drives a pulley 93 mounted to turn on a rearward extension 23c of the stud shaft 23b which is supported to extend rearwardly from bracket 23. Said shaft extension 23c also carries a drive pulley 93b which through a cross belt 93c drives a pulley 35e secured to turn with auxilliary brush shaft 35b.

Figure 17:
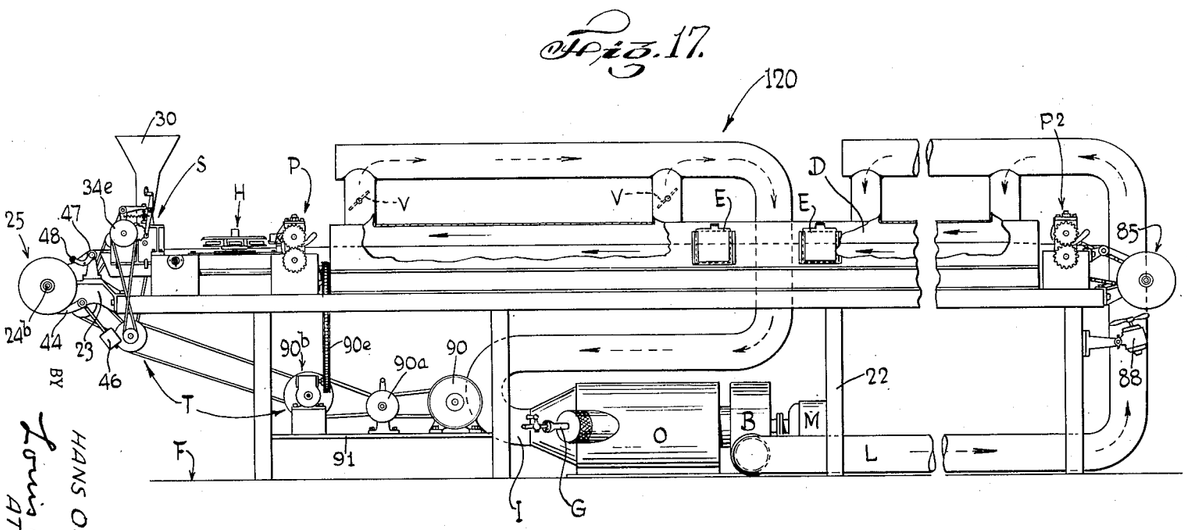
Fig. 17 is a side elevational view of a machine of modified construction embodying the invention for manufacturing the heat sealing filter sheet material.

There is also provided a set of mesh gears, one gear 34e mounted on a rearward extension of the fluted roller shaft 32c, the other gear 34e mounted for turning on a shaft 34f supported on the end of an adjustable carrier plate 34g, the shaft 34f carrying a drive sprocket 34h which through the chain belt 40 is driven by said cross shaft 38. By means of a slot and bolt connection 34j the carrier plate 34g may be adjusted to permit changes in the relative size of meshed gears 34e whereby the speeds of the fluted gear 32 can be varied as desired. The cross shaft 38 through a worm and wheel denoted generally at 41 is driven from a line shaft 42 extending practically the length of the machine 20 along the rear side thereof above the level of bed plate 21. Said line shaft 42 is supported in suitable spaced hanger bearings 43, and at each of the pressure means P, P1 and P2 there is provided worm gear drives 41a which connect directly with the lower roller shafts 51a and 71a of said pressure means P and P1, P2, respectively. The above described transmission through line shaft 42 connects with the drive chain 82a operating the rewinding means W by means of a sprocket wheel 41b mounted on roller shaft 72a of the pressure means P2, as shown in Figs. 2, 5 and 6, the line shaft 42 being provided with a sprocket 42a driven by chain 90e from the reduction gearing 90b as shown in Figs. 1, 15 and 17.

The operation of improved machine 20 for manufacturing heat sealing filter sheet material 28 will now be readily understood. After the parts of the machine 20 have been constructed and assembled to operate as shown in the drawings and above described, a roll R of porous base layer web 27 is mounted in reel 25 to provide a continuous supply source of the travelling web. It has been found in practise that when said base layer is made of filter paper vegetable fibrous pulp, that a stock sheet of approximately .001 inch thick gives satisfactory results for the purposes described. The base layer web 27 is successively drawn under roller 48 over roller 47, through spreader S, that is, between side plates 36 and under the fluted roller 32 and brushes 33, 34 and 35, all as shown in Fig. 3. Then with the heater plate 41 of heater H swung in open position shown in dotted lines in Fig. 10 and the upper roller 51 of the pressure means P pried up from its operative position against lower roller 52 by depressing levers 56, said web 27 is passed therethrough. In a like manner, the leading end of web 27 is next passed over ramp reflector 63 and supporting roller 62 with the heater plates 61 of the heaters H1 and H2 swung open and between upper roller 71 and lower rollers 72 pried apart by levers 76 of pressure means P1 and P2, as is clear from Figs. 1, 3 and 5. Finally, the leading end of the web 27 is passed over and beyond roller 77 to the take-up reel 85 for recoiling. With the web 27 stretched taut, the parts of heater H, H1 and H2 swing into effective position as shown in full lines in Figs. 10 and 7, and the upper rollers 51 and 71 of pressure means P, P1 and P2 released to clamp the web. The machine 20 is now ready to be started in operation by first connecting in circuit the heaters H, H1 and H2 and then the motor 90 to suitable electric supply sources (not shown) in the well understood manner.

The running of the motor through part of power transmission T above described agitates the coating material 31 in receptacle 30 to freely flow and uniformly feed the rotation of fluted roller 32 for distribution over the upper surface of the web 27 travelling thereunder. The web 27 with said coating material 31 in passing through heater H is then pressed by pressure means P into surface of web 27 to provide a "partially fused" superficial coating thereon. The coated travelling web after leaving pressure means P is successively heated and pressed as it passes through the heater H1 and pressure means P1, and again through heater H2 and pressure means P2 until the heat sealing filter sheet material 28 having the characteristics above described leaves the pressure means P2, said sheet material being wound up in coil C on the reel 85 of the rewinding means W. The speed of the travelling web through the machine 20 may be varied by the speed changer 90a in conventional manner where the motor 90 is of the constant speed type.

Should the travelling web 27 vary from a central alignment with respect to the rollers of pressure means P, P1 and P2 and the reel 85 of the rewinding means W, the said alignment may be adjusted by the screwing handwheel 25h in or out on the bolt 25j, as is obvious from Figs. 4, 13 and 14.

Should it be desired to change the speeds of the fluted roller 32 for increasing or decreasing spraying the material 31 with respect to the travel movement of the web 27 through the machine 20, the set of gears 34e may be replaced by others and the slot and bolt connection 34j adjusted for remeshing the replaced gears in the well understood manner.

While machine 20 has been described above as operating with a vegetable fibrous pulp porous paper base layer web 27, it is understood that other kinds of base layer web may be used for producing heat sealing filter sheet material 28, such for example as filter sheet material formed of cotton staple pulp, thin sheets of perforated parchment paper and Cellophane, cotton gauze textile sheets or the like. These various kinds of base layer webs used in producing heat sealing filter sheet material 28 are fully described in said Menzel application aforementioned.

In Fig. 17 is shown a modified form of machine 120 constructed to embody the invention. Machine 120 may be like machine 20 described above and shown in Figs. 1 to 16, inclusive, except that the units of machine 20 comprising heater H1 and pressure means P1 and heater H2 are replaced by an enclosed heater system. The latter may comprise a suitable heat source, as for example a gas burner G for heating air in an oven O which connects with the inlet end of a blower B. The hot air from the blower B circulates the air through a supply conduit L into the sheet material finishing end of closed heating chamber or dryer D through which the web 27 with the molten and pressed material passes from the pressure means P. The hot air is exhausted at the sheet material feeding end and is returned to the oven inlet I for reheating and recirculation. To control the flow of air through the system, suitable valves V may be provided. Spaced covered hand holes E along the dryer D serve to give ready access to the interior of the drier D for threading the web therethrough between pressure means P and P2. Machine 120 operates in the same manner as machine 20 described above with the exception that the travelling web is "partially fused" with coating material in the closed dryer D which may be of suitable length. The travelling web is held taut by making the rollers of pressure means P2 of greater diameter than those of pressure means P running at the same speed.

It will thus be seen that the machine as provided achieves the objects of the invention and is well adapted to meet the conditions of practical use in an efficient manner.

As various embodiments might be made in the above invention and as various changes might be made in the embodiments above set forth, it is to be understood that all matters herein set forth or shown in the accompanying drawings are to be interpreted as illustrative and not in a limiting sense.

Having thus described my invention, I claim as new and desire to secure by Letters Patent:

1. In a machine of the character described, a source for supplying a travelling porous layer base web, a receptacle for coating material including a distributing means mounted to uniformly deposit coating material from the receptacle in a uniform thin layer on to a travelling web coming from said source, and means including a plurality of heaters and sets of rollers alternately spaced apart along the path of movement of said web with said thin layer of coating material for "partially fusing" and for compressing the same in position as deposited by the distributing means by successive action by the distributing means by successive action to form a pervious superficial extremely thin lamina adhering to the web in the production of a "thermosetic" heat sealing filter sheet material.

2. A machine of the character described comprising a bed frame, a source for supplying a continuous travelling filter layer base web on one end of said frame, a coating material receptacle mounted on the frame spaced from said supply source, distributing means positioned along the path of movement of said web for uniformly feeding coating material from the receptacle on to the travelling web coming from said source, means including a heater spaced from said distributing means to extend over the coating material on said web for "partially fusing" the coating material in same position as fed onto the web by the distributing means, and means for pressing the heated "partially fused" coating into a pervious superficial extremely thin lamina adhering to the web to provide therewith a "thermosetic" heat sealing filter sheet material of substantially the same filtering capacity as the porous travelling web, said pressing means acting to advance said web at a uniform speed through the machine.

3. In the machine as defined in claim 1 which includes a power transmission means connecting with said rollers for advancing the web with coating continuously through the machine in a taut condition and means for locating the distributing and "partial fusing" means to retain the travelling web with the coating material in a substantially horizontal plane during the passage therealong.

4. The machine defined in claim 2 which includes a power transmission means for moving the travelling web through the operation of said pressing means.

5. In a machine of the character described, a source for supplying a travelling porous base web, a receptacle for coating material including a distributing means mounted along the path of travel of said webs for continuously depositing measured quantities of the coating material from the receptacle and depositing same in a layer of uniform thickness onto the travelling web, means including a plurality of spaced heater and pressure units, each of which acts in succession to "partial fuse" the coating material in the deposited position on the web until a pervious superficial lamina is formed adhering to the web providing therewith a "thermosetic" heat sealing filter sheet material.

6. A machine of the character described comprising a bed frame, a source for supplying a travelling filter base web on one end of said frame, a coating material receptacle mounted on the frame spaced from said supply source, distributing means for uniformly depositing coating material from the receptacle on to the travelling web coming from said source, a heater spaced from the distributing means for "partially fusing" the coating material carried on said web in the same position as deposited by the distributing means, means carried on the frame adjacent said heater for pressing said "partially fused" coating material into a pervious superficial extremely thin lamina adhering to said web to provide therewith a "thermosetic" heat sealing filter sheet material of substantially the same filtering capacity as said travelling web, said pressing means acting to continuously advance the web for the coating distributing and "partially fusing" thereof through the machine in taut condition including a set of rollers between which the web with the "partially fused" coating is compressed in the same position as deposited by the distributing means, and a power transmission for operating said rollers to advance the travelling web at a uniform speed through the machine.

7. In a machine of the character described, means for moving a base web through the machine at a uniform speed, a receptacle for coating material including a distributing means mounted to feed coating material from the receptacle onto said moving web, said distributing means including a rotary roller having flutes on the surface thereof in parallel alignment to the axis of rotation arranged to extend into the receptacle for taking a measured quantity of coating material therefrom, spaced rotary brushes contacting the roller to assure positive removal of said material from the roller fluted surfaces, and brush means coacting with one of said rotary brushes for keeping the latter free from said material.

8. In a machine for manufacturing heat sealing filter sheet material, means for continuously moving a base layer web formed of a porous fiber structure through the machine at a uniform speed, means for depositing measured quantities of a dry fluent coating material in a thin layer on the moving web, means for "partially fusing" said coating in the thin layer as deposited on the moving web, and means for compressing the coating while in "partially fused" state to conform and adhere to the fiber structure of the web for providing a pervious lamina of substantially the same porosity as the web, said means for compressing the coating includes a plurality of spaced rollers of progressively increasing diameter driven at uniform speed to keep the moving web taut and in tension.

HANS O. IRMSCHER.